Patented Dec. 9, 1952

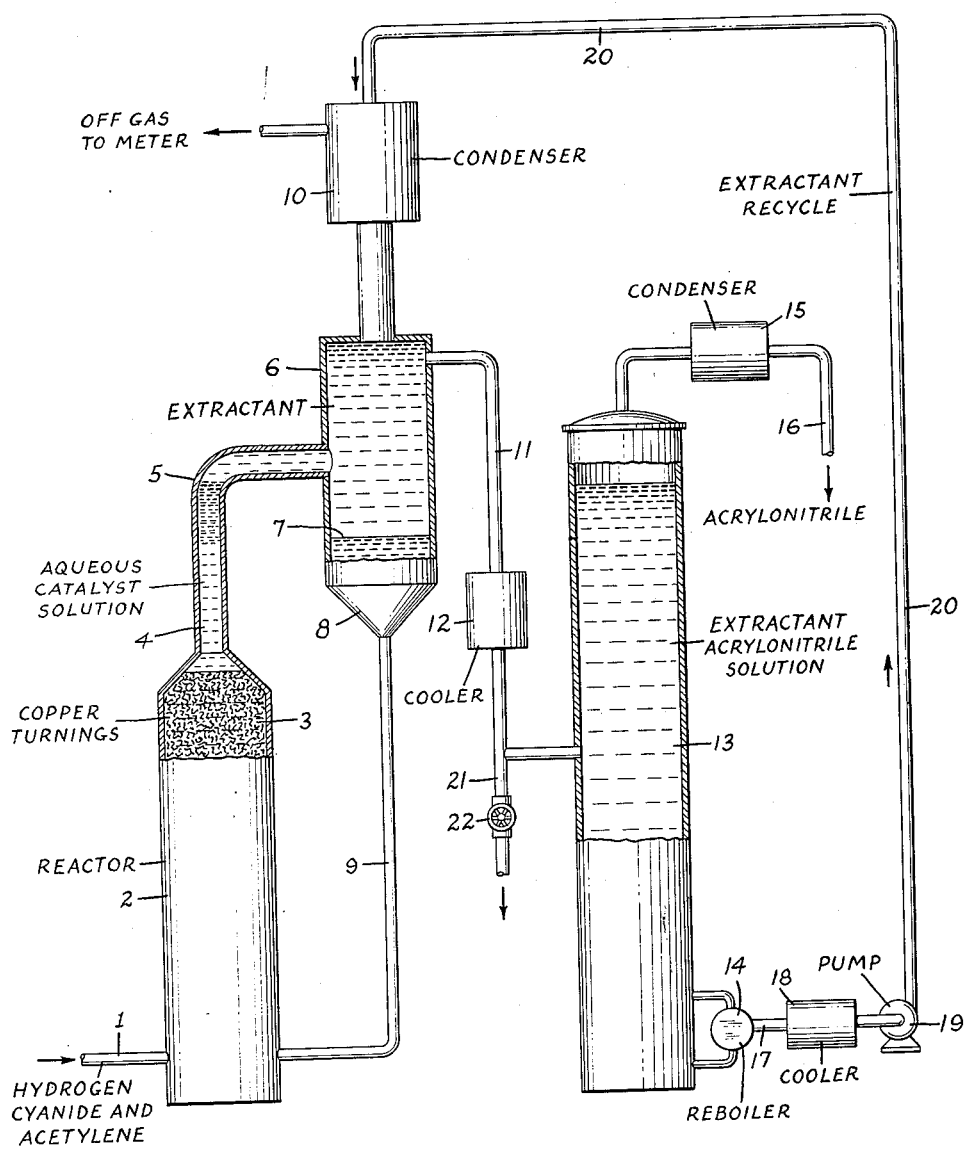

2,621,204

UNITED STATES PATENT OFFICE 2,621,204

PRODUCTION OF ACRYLONITRILE

Alexander F. MacLean, Robstown, and Donald E. Pickart, Corpus Christi, Tex., assignors to Celanese Corporation of America, New York, N. Y., a corporation of Delaware Application January 26, 1950, Serial No. 140,699

11 Claims. (Cl. 260—465.3)

This invention relates to the production of acrylonitrile and relates more particularly to an improved process for the continuous production of acrylonitrile by the reaction of acetylene with hydrogen cyanide.

An object of this invention is the provision of an improved process for the continuous catalytic produtcion of acrylonitrile whereby acetylene and hydrogen cyanide are reacted in the presence of a suitable catalyst and the acrylonitrile formed is rapidly and continuously removed as it is formed from the unreacted acetylene and hydrogen cyanide as well as from any by-products.

Other objects of this invention will appear from the following detailed description and the accompanying drawing.

The drawing is a diagrammatic showing of the manner in which the novel process of our invention may be carried out.

As is well known, acrylonitrile may be obtained by passing a mixture of hydrogen cyanide and acetylene over a suitable catalyst. The reaction may be effected in the vapor phase employing a solid catalyst and reaction temperatures of 400 to 500° C. or a liquid phase reaction may be effected at temperatures of 70 to 100° C. by passing the mixture of gases through a catalyst comprising a concentrated aqueous solution of cuprous chloride and ammonium chloride. Fairly satisfactory yields may be obtained by carrying out the aforementioned processes, but certain undesirable side reaction products, such as acetaldehyde, chloroprene, cyano-butadiene and lactonitrile as well as high boiling impurities, such as acetylene polymers, are formed in appreciable amounts and the separation of these products from the acrylonitrile is inconvenient and costly.

We have now found that the production of acrylonitrile by the catalytic reaction of acetylene with hydrogen cyanide may be carried out with increased efficiency and economy and a highly purified product obtained directly without a separate purification step if the acrylonitrile is separated, as it is formed from both the liquid phase, comprising the aqueous catalyst solution, and from the gaseous phase comprising unreacted acetylene and hydrogen cyanide. In accordance with our novel process, separation is effected by passing both the reaction gas mixture and the aqueous catalyst solution into an inert aromatic solvent absorbent for the acrylonitrile present in the reaction gas mixture and in the aqueous catalyst solution, separating the unreacted acetylene and hydrogen cyanide and the insoluble aqueous catalyst solution from the absorbent and recycling both the unreacted gases remaining and the aqueous catalyst solution to the process. The absorbed acrylonitrile is separated and simultaneously purified by distillation from the inert solvent absorbent.

To form acrylonitrile in accordance with the process of this invention, a mixture of acetylene and hydrogen cyanide in a proportion of about 1 to 2 volumes of acetylene for each volume of hydrogen cyanide present, and preferably in a mol ratio of 1 to about 1.3 mols of acetylene for each mol of hydrogen cyanide, is passed through a reactor filled with copper turnings and containing a reaction catalyst comprising an aqueous solution of cuprous chloride nad ammonium chloride. The copper turnings act not only to break the gases into fine bubbles and to enable intimate mixing to be achieved but also to maintain the copper salt in solution in the reduced cuprous state. Preferably, the reactor and the catalyst contained therein are maintained at a temperature of 70 to 100° C., optimum results being obtained at a reaction temperature of about 85° C. The gaseous reaction mixture leaving the catalytic reactor comprises acrylonitrile and unreacted acetylene and hydrogen cyanide. Part of the acrylonitrile formed dissolves in the aqueous catalyst solution.

To separate the acrylonitrile thus formed from the catalyst solution and from the unreacted acetylene and hydrogen cyanide in accordance with our novel process, both the catalyst solution and the gaseous reaction mixture formed are passed into an extraction zone containing an aromatic hydrocarbon such as, for example, toluene, ortho-, meta-, or para-xylene, diphenyl ether or diphenyl. We have found that, while neither hydrogen cyanide nor acetylene is soluble in said aromatic solvents, nor is the aqueous catalyst solution, the acrylonitrile present is highly soluble. Accordingly, a very effective separation is thus achieved. The acrylonitrile in solution in the aromatic solvent may be readily recovered in a highly purified form by fractional distillation of the aromatic solvent solution. Any high boiling impurities which may form during the catalytic reaction of the acetylene and hydrogen cyanide remain in solution in the aromatic solvent. These impurities may be separated from the aromatic solvent, if the concentration therein becomes too high and contamination of the catalyst is threatened, by a distillation of the aromatic solvent after removal of the acrylonitrile. The aromatic solvent is returned to the system and the high-boiling impurities are discarded. Preferably, the extractant is recycled at a rate sufficient to prevent the acrylonitrile concentration in the catalyst solution from becoming excessive and causing product decomposition. The recyclerate should be above 1.2 volumes of extractant per volume of catalyst solution per hour.

Thus, our novel process may be carried out in a continuous manner and acrylonitrile of very high purity obtained in a highly satisfactory yield in accordance with the following example.

*Example*

The process of our invention may be more clearly understood by reference to the accompanying drawing which comprises a diagrammatic showing of a preferred embodiment of said process. Referring now to the drawing, a mixture of hydrogen cyanide and acetylene in a volumetric ratio of 1 volume of hydrogen cyanide to 1.3 volumes of acetylene is forced through an inlet pipe 1 into a reactor 2 filled with copper turnings 3 and containing as the reaction catalyst an aqueous solution 4 comprising about 6 parts by weight of cuprous chloride, 3 parts by weight of ammonium chloride and 7 parts by weight of water and maintained, with the copper in a reduced state, at a pH of 1.0 by the addition of aqueous 35% hydrochloric acid and a small amount of formic acid. The aqueous solution is maintained at a temperature of 70 to 100° C. during the passage of the gaseous mixture therethrough. The rate at which the hydrogen cyanide and acetylene are introduced is preferably such that about 0.9 to 1.0 part by weight per hour of acrylonitrile are formed for each 100 parts by weight of catalyst solution.

The mixture of reaction gases formed in the reactor 2 passes upwardly through a pipe 5 and into an extractor 6 containing an aromatic solvent extractant such as toluene, for example, maintained at the temperature of the catalyst solution. Since the extractant is lower in specific gravity than the aqueous catalyst solution and is immiscible therewith, the extractant floats on the surface of the aqueous catalyst in extractor 6 and a definite interface 7 is maintained. The aqueous catalyst solution which is carried over into extractor 6 falls to the conical base 8 thereof and is returned by gravity flow to reactor 2 through a catalyst recycle line 9. The acrylonitrile present in the reaction gases and in the catalyst solution is absorbed in the extractant and the uncondensed hydrogen cyanide and acetylene pass upwardly through a condenser 10 where any unabsorbed acrylonitrile is condensed out and returned to extractor 6. The off-gases are then sent to a meter where they are measured and recycled to the system together with whatever make-up gas is necessary to maintain the desired reaction ratio.

A continuous overflow of the solvent absorbent solution of acrylonitrile is maintained, the solution leaving extractor 6 through an overflow line 11. The solution passes through a cooler 12 and is then introduced into a still 13 provided with a reboiler 14, whereby the acrylonitrile in the extractant solution is distilled off. The reboiler temperature is held at the boiling point of the extraction agent. The vaporized acrylonitrile distilled off is condensed overhead in a condenser 15 and taken off through a line 16. The stripped extractant is removed from still 13, a side stream being withdrawn from reboiler 14 through a line 17. After passing through a cooler 18 where the temperature of the side stream of the extractant is reduced to about 10 to 30° C., the extractant is forced by a pump 19 through recycle line 20 and is returned to the system through condenser 10 wherein the extractant flow acts to scrub the unreacted and unabsorbed off-gases before entering extractor 6 where it again acts to absorb the acrylonitrile in the reaction gases. Any water carried into cooler 12 falls into a leg 21 and may be withdrawn therefrom through a valve 22.

By our novel process, yields of acrylonitrile of from 94 to 97% of theory based on the hydrogen cyanide employed may be consistently obtained. The continuous nature of our novel process wherein continuous separation of the acrylonitrile as formed is achieved minimizes side reaction and enables acrylonitrile of very high purity to be produced.

It is to be understood that the foregoing detailed description is given merely by way of illustration and that many variations may be made therein without departing from the spirit of our invention.

Having described our invention, what we desire to secure by Letters Patent is:

1. In a process for the production of acrylonitrile whereby a mixture of hydrogen cyanide and acetylene is passed through an aqueous solution of a catalyst for said reaction, the steps which comprise passing the mixture of reaction gases formed by said reaction and the aqueous catalyst solution through an aromatic liquid hydrocarbon absorbent in which the aqueous catalyst solution is insoluble, absorbing the acrylonitrile in the absorbent so as to separate the acrylonitrile as formed from both the aqueous solution and the unreacted hydrogen cyanide and acetylene, and separating the acrylonitrile from the liquid absorbent.

2. In a process for the production of acrylonitrile whereby a mixture of hydrogen cyanide and acetylene is passed through an aqueous solution of a catalyst for said reaction, the steps which comprise passing the mixture of reaction gases formed by said reaction and the aqueous catalyst solution through an aromatic liquid absorbent selected from the group consisting of benzene, toluene, diphenyl ether, diphenyl and the isomeric xylenes, absorbing the acrylonitrile therein so as to separate the acrylonitrile as formed from the unreacted hydrogen cyanide and acetylene, and separating the acrylonitrile from the liquid absorbent.

3. In a process for the production of acrylonitrile whereby a mixture of hydrogen cyanide and acetylene is passed through an aqueous solution of a catalyst for said reaction in a reaction zone, the steps which comprise continuously circulating a stream of an aromatic liquid hydrocarbon absorbent in which the aqueous catalyst solution is insoluble through an extraction zone and a distillation zone, passing the mixture of reaction gases formed on catalytic reaction of the hydrogen cyanide and acetylene and the aqueous catalyst solution into the extraction zone whereby the acrylonitrile present in the reaction gases and in the aqueous catalyst solution is absorbed in said absorbent, removing the acrylonitrile from the aromatic absorbent solution thus formed by a distillation operation in the distillation zone, and returning the aromatic absorbent to the extraction zone.

4. In a process for the production of acrylonitrile whereby a mixture of hydrogen cyanide and acetylene is passed through an aqueous solution of a catalyst for said reaction in a reaction zone, the steps which comprise continuously circulating a stream of an aromatic liquid absorbent selected from the group consisting of benzene, toluene, diphenyl ether, diphenyl and isomeric xylenes, through an extraction zone and a distillation zone, passing the mixture of reaction gases formed on catalytic reaction of the hydrogen cyanide and acetylene and the aqueous catalyst solution into the extraction zone whereby the acrylonitrile present in the reaction gases and in the aqueous catalyst solution is absorbed in said absorbent, removing the acrylonitrile from the aromatic absorbent solution thus formed by a distillation operation in the distillation zone, and returning the aromatic absorbent to the extraction zone.

5. In a process for the production of acrylonitrile whereby a mixture of hydrogen cyanide and acetylene is passed through an aqueous solution of a catalyst for said reaction in a reaction zone, the steps which comprise continuously circulating a stream of an aromatic liquid absorbent selected from the group consisting of benzene, toluene, diphenyl ether, diphenyl and isomeric xylenes, through an extraction zone and a distillation zone, passing the mixture of reaction gases formed on catalytic reaction of the hydrogen cyanide and acetylene and the aqueous catalyst solution into the extraction zone whereby the acrylonitrile present in the reaction gases and in the aqueous catalyst solution is absorbed in said absorbent, removing the acrylonitrile from the reaction absorbent solution thus formed by a distillation operation in the distillation zone, returning the aromatic absorbent to the extraction zone and returning the aqueous catalyst solution to the reaction zone.

6. In a process for the production of acrylonitrile whereby a mixture of hydrogen cyanide and acetylene is passed through an aqueous solution of a catalyst for said reaction in a reaction zone, the steps which comprise continuously circulating a stream of toluene through an extraction zone and a distillation zone, passing the mixture of reaction gases formed on catalytic reaction of the hydrogen cyanide and acetylene and the aqueous catalyst solution into the extraction zone whereby the acrylonitrile present in the reaction gases and in the aqueous catalyst solution is absorbed in the toluene, removing the acrylonitrile from the toluene solution thus formed by a distillation operation in the distillation zone, and returning the purified toluene to the extraction zone.

7. In a process for the production of acrylonitrile whereby a mixture of hydrogen cyanide and acetylene is passed through an aqueous solution of a catalyst for said reaction in a reaction zone, the steps which comprise continuously circulating a stream of toluene through an extraction zone and a distillation zone, passing the mixture of reaction gases formed on catalytic reaction of the hydrogen cyanide and acetylene and the aqueous catalyst solution into the extraction zone whereby the acrylonitrile present in the reaction gases and in the aqueous catalyst solution is absorbed in the toluene, removing the acrylonitrile from the toluene solution thus formed by a distillation operation in the distillation zone, returning the purified toluene to the extraction zone and returning the aqueous catalyst solution to the reaction zone.

8. In a process for the production of acrylonitrile whereby a mixture of hydrogen cyanide and acetylene is passed through an aqueous solution of a catalyst for said reaction in a reaction zone, the steps which comprise continuously circulating a stream of xylene through an extraction zone and a distillation zone, passing the mixture of reaction gases formed on catalytic reaction of the hydrogen cyanide and acetylene and the aqueous catalyst solution into the extraction zone whereby the acrylonitrile present in the reaction gases and in the aqueous catalyst solution is absorbed in the xylene, removing the acrylonitrile from the xylene solution thus formed by a distillation operation in the distillation zone, and returning the purified xylene to the extraction zone.

9. In a process for the production of acrylonitrile whereby a mixture of hydrogen cyanide and acetylene is passed through an aqueous solution of a catalyst for said reaction in a reaction zone, the steps which comprise continuously circulating a stream of xylene through an extraction zone and a distillation zone, passing the mixture of reaction gases formed on catalytic reaction of the hydrogen cyanide and acetylene and the aqueous catalyst solution into the extraction zone whereby the acrylonitrile present in the reaction gases and in the aqueous catalyst solution is absorbed in the xylene, removing the acrylonitrile from the xylene solution thus formed by a distillation operation in the distillation zone, returning the purified xylene to the extraction zone and returning the aqueous catalyst solution to the reaction zone.

10. In a process for the production of acrylonitrile whereby a mixture of hydrogen cyanide and acetylene is passed through an aqueous solution of a catalyst for said reaction in a reaction zone, the steps which comprise continuously circulating a stream of diphenyl ether through an extraction zone and a distillation zone, passing the mixture of reaction gases formed on catalytic reaction of the hydrogen cyanide and acetylene and the aqueous catalyst solution into the extraction zone whereby the acrylonitrile present in the reaction gases and in the aqueous catalyst solution is absorbed in the diphenyl ether, removing the acrylonitrile from the diphenyl ether solution thus formed by a distillation operation in the distillation zone, and returning the purified diphenyl ether to the extraction zone.

11. In a process for the production of acrylonitrile whereby a mixture of hydrogen cyanide and acetylene is passed through an aqueous solution of a catalyst for said reaction in a reaction zone, the steps which comprise continuously circulating a stream of diphenyl ether through an extraction zone and a distillation zone, passing the mixture of reaction gases formed on catalytic reaction of the hydrogen cyanide and acetylene and the aqueous catalyst solution into the extraction zone whereby the acrylonitrile present in the reaction gases and in the aqueous catalyst solution is absorbed in the diphenyl ether, removing the acrylonitrile from the diphenyl ether solution thus formed by a distillation operation in the distillation zone, returning the purified diphenyl ether to the extraction zone and returning the aqueous catalyst solution to the reaction zone.

ALEXANDER F. MacLEAN.
DONALD E. PICKART.

REFERENCES CITED

The following references are of record in the file of this patent:

UNITED STATES PATENTS

| Number | Name | Date |
| --- | --- | --- |
| 2,324,854 | Kurtz et al. | July 20, 1943 |
| 2,385,327 | Bradley et al. | Sept. 25, 1945 |
| 2,392,303 | Balcar | Jan. 8, 1946 |
| 2,404,163 | Carpenter et al. | July 16, 1946 |
| 2,409,124 | Heuser | Oct. 8, 1946 |
| 2,500,403 | Davis et al. | Mar. 14, 1950 |